United States Patent [19]
Wang

[11] Patent Number: 5,828,881
[45] Date of Patent: Oct. 27, 1998

[54] SYSTEM AND METHOD FOR STACK-BASED PROCESSING OF MULTIPLE REAL-TIME AUDIO TASKS

[75] Inventor: Avery L. Wang, Redwood City, Calif.

[73] Assignee: Chromatic Research, Inc., Sunnyvale, Calif.

[21] Appl. No.: 556,420

[22] Filed: Nov. 9, 1995

[51] Int. Cl.[6] .................................................. G06F 15/163
[52] U.S. Cl. ..................................... 395/680; 395/200.64
[58] Field of Search .................................... 395/680, 683, 395/670, 671, 672, 200.64

[56] References Cited

U.S. PATENT DOCUMENTS

| | | | |
|---|---|---|---|
| 4,937,737 | 6/1990 | Schwane et al. | 395/680 |
| 5,376,752 | 12/1994 | Limberies et al. | 84/622 |
| 5,532,556 | 7/1996 | Anderson et al. | 375/356 |
| 5,539,833 | 7/1996 | Yamashita et al. | 381/98 |

OTHER PUBLICATIONS

"Distributed Operating System, The Logic Design", Andrzej Goscinske Addison–Wesley Publishing Company, 1991, pp. 135–137, pp. 276–277.

*Primary Examiner*—Majid A. Banankhan
*Attorney, Agent, or Firm*—Skjerven Morrill MacPherson Franklin & Friel L.L.P.; Ken J. Koestner

[57] ABSTRACT

A system and method for stack-based processing of multiple real-time tasks operates on a net list of tasks which operate essentially simultaneously with system resources shared between tasks in a dynamic configuration. This system and method operate to control dispatching of messages which activate signal processing tasks, sequencing of processes activated by the messages and management of signal flow. Tasks are dynamically activated and deactivated in accordance with the specification by the net list by manipulating the task signals on the stack, thereby substantially reducing high-speed memory requirements of the system.

19 Claims, 10 Drawing Sheets

SYSTEM AND METHOD FOR STACK-BASED PROCESSING OF MULTIPLE REAL-TIME AUDIO TASKS

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever

BACKGROUND OF THE INVENTION

1. Field of the Invention

The present invention relates to signal processing systems and, more specifically, to an operating environment for processing multiple real-time signals.

2. Description of the Relevant Art

Real time operating systems (RTOs) are commonly used in special-purpose embedded systems in widely ranging device areas such as automotive controllers, military tracking devices, large switching system managers, multimedia processors and a multitude of other systems, similar and dissimilar. Despite the wide range of RTO applications, real time operating systems do share similar characteristics and requirements. For example, the electronic and computational systems available for processing the RTOs are physically constrained, having limited physical memory and backing storage. Furthermore, RTOs are time constrained so that each software task of the operating system must operate in lock-step time precision. Otherwise, the entire system may fail to perform correctly. The time constraints on RTOs generally are a greater limitation on performance and system requirements than are the physical constraints.

One example of a system having a real time responsiveness is a digital signal processing system (DSP). DSPs are used in many device areas. One application of DSPs to achieve real time responsiveness is usage in multimedia systems to manage audio, video and graphics. In multimedia systems, the audio information stream should remain sufficiently constant that the human ear detects a pleasing sound and the human eye detects an image that is properly updated and refreshed.

The large quantities of data that must be processed rapidly in a multimedia system necessitate usage of special-purpose high speed signal processing hardware. Software for controlling this special-purpose hardware should enhance rather than detract from system performance. Stringent resource and time constraints dictate that operating software achieve a performance speed that produces a pleasing multimedia performance as detected by human eyes and ears. This performance speed is to be maintained while remaining within the resource limits of the hardware system.

SUMMARY OF THE INVENTION

In accordance with the present invention, a signal-flow topology is generated from a linear process table by pro-cessing modules that push and pop signal information to and from a stack. Accordingly, no global linking is necessary for generating the signal topology, rather only local manipulation is utilized. A system and method for stack-based processing of multiple real-time tasks operates on a net list of tasks which operate essentially simultaneously with system resources shared between tasks in a dynamic configuration. This system and method operate to control dispatching of messages which activate signal processing tasks, sequencing of processes activated by the messages and management of signal flow. Tasks are dynamically activated and deactivated in accordance with the specification of messages on the net list by manipulating task signals on the stack, thereby substantially reducing high-speed memory requirements of the system.

In accordance with an embodiment of the present invention, a software system is provided which controls a real-time signal processor. The real-time signal processor includes a host computer, a message queue, a stack and a media I/O circuit. The host computer sends a plurality of messages designating ones of a plurality of corresponding signal processing operations asynchronously to the message queue. Each signal processing operation corresponds to a client processing module. The software system includes a message processing routine for reading the messages from the message queue and dispatching the messages to designated ones of the plurality of client processing modules and a process sequencing routine for invoking client processing modules and for controlling the stack. The client processing modules communicate signals as a sending client processing module pushes a signal onto the stack and a receiving client processing module pops the signal from the stack.

In accordance with another embodiment of the invention, a signal processing system includes a host computer system having a host processor and an execution memory, a media input/output circuit connected to the host computer system. The media input/output circuit includes a media signal processor and a memory connected to the media signal processor. The memory includes a stack. The signal processing system further includes a host operating system for operating on the host processor, a host task for operating under the host operating system on the host processor and generating a net list of messages on a message queue for selecting signal processing processes, a resource manager (RM) software subsystem for operating on the host computer system and an interprocess communication operating system (XOS) for interacting in cooperation on the host processor and the media signal processor. The signal processing system also includes a synchronous net list processing routine for executing under XOS on the media signal processor. The synchronous net list processing routine has a plurality of client processing modules each corresponding to a signal processing process. Each client processor module processes signals and communicates signals to a client processor module. The synchronous net list processing routine also includes a message processing routine for reading the messages from the message queue and synchronously dispatching the messages to designated ones of the plurality of client processing modules and a process sequencing routine for invoking client processing modules and for controlling the stack. The client processing modules communicate signals in which a sending client processing module pushes a signal onto the stack and a receiving client processing module pops the signal from the stack.

In accordance with a further embodiment of the invention, a method of scheduling a plurality of signal processes designated by a net list of signal processes uses a stack-based protocol to manage signal flow topology. The method includes the steps of generating a plurality of sequential output synchronization timing signals, parsing a new net list of signal processes to generate a new signal processing sequence, and writing the signal processing sequence into a message queue. The method further includes the steps of waiting for an output synchronization timing signal and, in response to an output synchronization timing signal, reading the signal processing sequence from the message queue. The method then copies the signal processing sequence into a process sequence table so that a new signal flow topology is specified.

Many advantages are achieved by the disclosed system and method. One advantage is that signal flow is managed so that various processes function essentially simultaneously in a dynamically configurable topology of signal flow so that system resource usage is conserved. Another advantage is that usage of stack-based signals to communicate between real-time tasks advantageously smoothes playback of audio signals while furnishing accurate waveform sampling and reproduction. It is further advantageous that messages are listed relative to one another in the timed message queue so that timing of the multiple messages is synchronized and a separate accurate timer is not necessary. Usage of the stack for dynamically configurable topology of signal flow handling is advantageous since memory usage is reduced in comparison to usage of dedicated memory elements. Because the amount of memory used is reduced, the stack is advantageously implemented in static RAM so that speed performance is enhanced. Usage of the stack allows the SRAM to be shared between many devices.

A further advantage of the described stack-based signal flow is that no relinking of code is necessary since each processing module accesses the stack for all input and output signals. As a result, the net list is quickly reconfigured.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION OF THE INVENTION

The following sets forth a detailed description of the best contemplated mode for carrying out the invention. The description is intended to be illustrative of the invention and should not be taken to be limiting.

Figure 1:
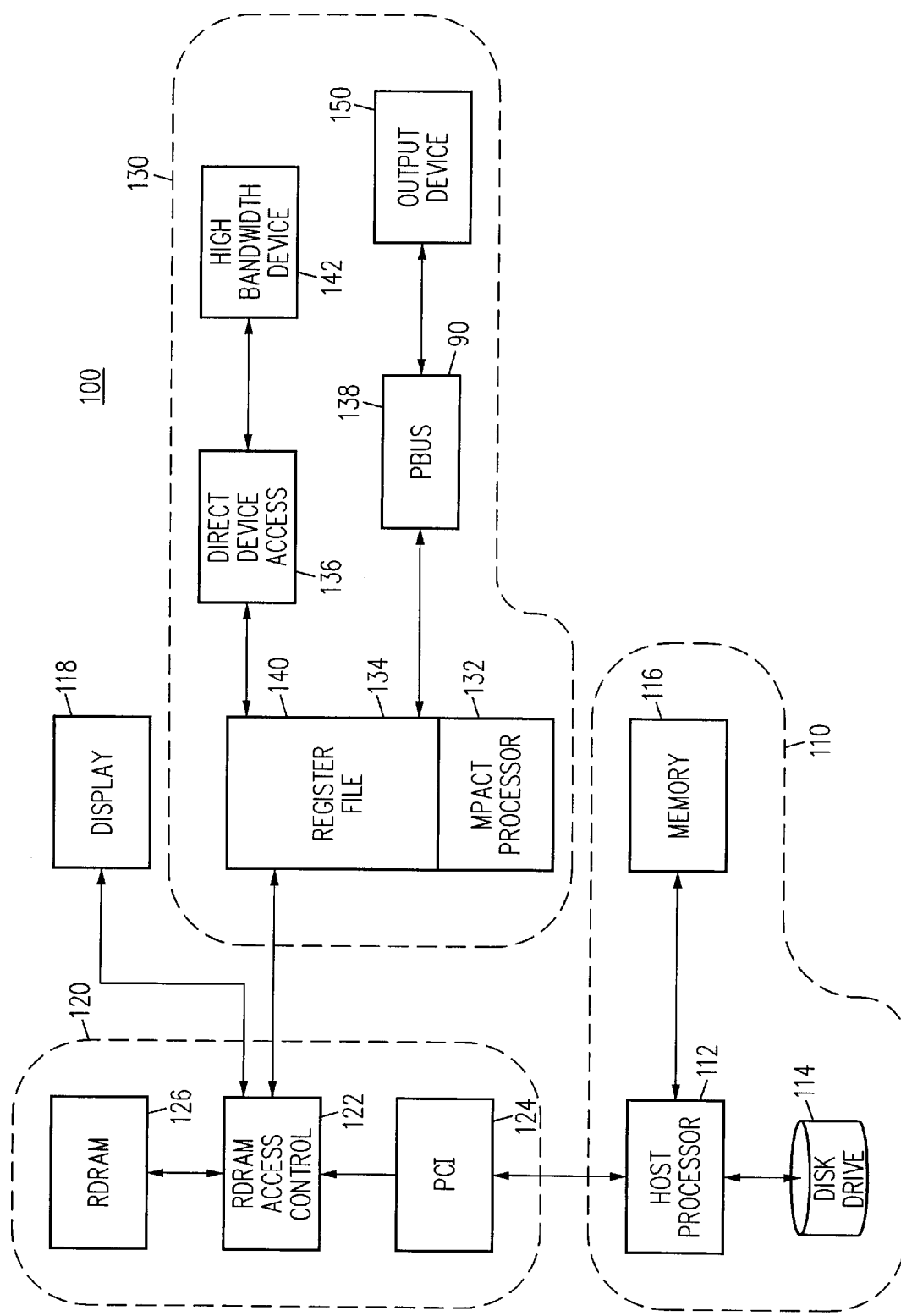
FIG. 1 is a schematic block diagram which illustrates hardware components of a media processor system.

Referring to FIG. 1, a schematic block diagram illustrates hardware components of a media processor system 100, including a host computer system 110, a memory circuit 120 and a media input/output circuit 130. The host computer system 110 includes a host processor 112, which is connected to a disk drive 114 and memory 116. The host processor 112 is typically a conventional microprocessor such as an Intel x86 series architecture microprocessor, a PowerPC™ architecture microprocessor or the like.

The memory circuit 120 includes a memory controller 122 and a PCI industry standard bus (PCI bus) 124 and that connects the memory controller 122 to the host processor 112. The memory controller 122 controls access to a memory 126, for example a dynamic random access memory (DRAM) or RAMBUS™ memory. The memory controller 122 is connected to a display device 118.

The media input/output circuit 130 includes a media signal processor 132, a register file 134, a direct device access circuit 136, such as a video bus, and a peripheral bus(Pbus) 138. The media signal processor 132 is a vector processor that performs simultaneous high-speed operations. The register file 134 is a set of individually-addressed registers that are programmed as special purpose registers. In the media input/output circuit 130, the register file 134 connects to the media signal processor 132, the direct device access circuit 136, the Pbus 138, in the media and also to the memory controller 122 of the memory circuit 120. The register file 134 is, for example, an on-chip static RAM 140 which supplies 4 Kbytes of memory. The on-chip static RAM 140 furnishes temporary buffers for other on-chip hardware and stores program code and working data. The 4 Kbytes of on-chip static memory 140 are sufficient memory space for transfer of data and instructions between the media input/output circuit 130 and the host processor 110. The static RAM 140, also referred to herein as register file 134, is divided into 512 72-bit double words. Various hardware and software systems in the media processor system 100 utilize the register file 134 for operations such as instruction caching and storage of instruction operand information and result data. The register file 134 also operates as a first-in/first-out (FIFO) buffer for hardware components including the direct device access circuit 136 and the Pbus 138 and for media processor system 100 operations such as emulation register control.

The direct device access circuit 136 is a buffer for connection to various high bandwidth devices 142 such as special purpose optical devices and cameras, and recording devices. The direct device access circuit 136 interfaces to the high bandwidth devices 142 to facilitate data transmission, both sending and receiving of data, directly to or from locations in the register file 134. The peripheral bus (Pbus) 138 drives various external output devices 150 such as audio devices, fax modems, and the like. Pbus 138 reads and writes directly out of register file 134.

Figure 2:
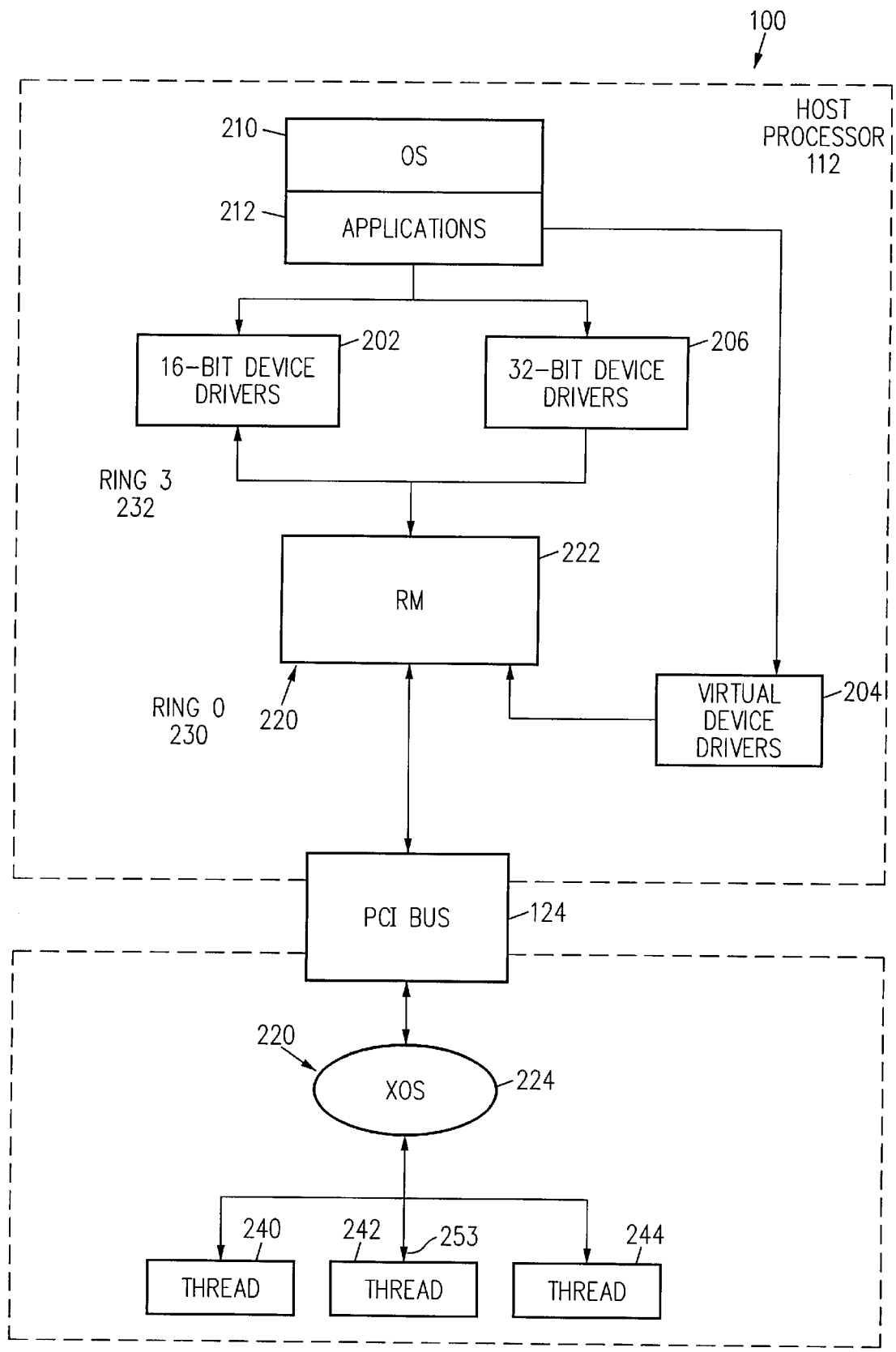
FIG. 2 is a block diagram of the combined hardware and software interfaces of the media processor system.

Referring to FIG. 2 in conjunction with FIG. 1, a block diagram of the combined hardware and software interfaces of the media processor system 100 shows the interrelationships of hardware components, including the host computer system 110, the memory circuit 120 and the media input/output circuit 130, to software systems including a host operating system 210 and a special-purpose media operating system 220. For an embodiment of the media processor system 100 in which the host computer system 110 is an x86 architecture processor, the host operating system 210 typically is a Windows 95™, Windows™ or MS-DOS™ operating system. The media operating system 220 includes two software subsystems, a resource manager (RM) 222 and an interprocess communication operating system (XOS) 224 which interact in cooperation on the host processor 112 and the media signal processor 132.

The XOS and RM software subsystems are described in detail in United States patent application Ser. No. 08/556,416 filed on the same day as the present patent application (Denis Gulsen, "A system and Method for Fast Context Switching between Tasks", Attorney Docket Number M-3566). This patent application is incorporated herein by reference in its entirety.

The media processor system 100 generally executes a Windows application program 212 on the host processor 112 and makes a call to a selected device driver of the illustrative device drivers 202, 204 and 206. The selected device driver responds by calling the resource manager (RM) 222. RM 222 is software that executes on the host processor 112 in conjunction with the host operating system 210.

Various software routines in the media operating system 220 are granted selected protected mode validation capabilities in accordance with the x86 protected mode definition in which hardware performs numerous validation checks on memory references, function calls, I/O port accesses and other items. A protection failure allows the host operating system 210 to gain control of host processor 112 operations. The host processor 112 furnishes ring 0 protection layer 230 and ring 3 protection layer 232. Software in the ring 0 protection layer 230 includes virtual device drivers (VDDs) 204, such as a virtualized DMA controller or virtualized VGA controller. Software in the ring 3 protection layer 232 includes device drivers 202 and 206, which execute on host processor 112. Software in RM 222 includes software routines that execute both in ring 0 protection layer 230 and ring 3 protection layer 232. The interprocess communication operating system (XOS) 224 and various XOS tasks 240, 242 and 244 execute on the media signal processor 132. XOS 224 executes from the memory 116. XOS 224 and RM 222 also use the memory 116 to transfer data from devices and to store and access communication subsystems implemented between XOS 224 and RM 222.

The host operating system 210 and RM 222 and XOS 224 of the media operating system 220 variously control, manage or otherwise communicate with different hardware and software components of the media processor system 100. XOS 224 and RM 222 have distinctive, yet closely intertwined, features.

RM 222 defines data types that correspond to data types of the media operating system 220. These definitions enable matching of the header files in the RM 222, which are used in the host operating system 210, to match data types in the media operating system 220. By using data types of the media operating system 220, the RM 222 defines data structures that are transferred over the PCI bus 124 between the host operating system 210 and the media operating system 220 using write and read structure calls. All data and information is transferred from the host computer system 110 over the PCI bus 124 to the DRAM 126. In this manner, the same data structures are used in both the host operating system 210 and the media operating system 220.

RM 222 controls static resource allocation and I/O bandwidth in memory circuit 120 by controlling thread processing. A thread is a collection of processes having an order which determines which process is eligible for execution. A thread is an element that is scheduled. Resources such as execution time, locks and queues are assigned to a thread. RM 222 controls thread processing first by allocating memory space in DRAM 126, then by creating and evicting threads. RM 222 allocates both instruction code and data sections of the DRAM 126. First, RM 222 allocates a DRAM 126 code section for creation of a thread, then links and downloads code into DRAM 126 blocks while a thread is active. RM 222 avoids improper access to the code segment of a thread by temporarily blocking the thread while relocating the code segment. Each XOS thread has one entry point that is called when the thread is created by RM 222. RM 222 then allocates a data space in DRAM 126 for the thread. A thread may own multiple data segments in DRAM 126 and switches between these segments. Only RM 222 can increase the DRAM 126 allocation of a thread.

In this manner, RM 222 controls DRAM 126 resources in a dynamically-configurable manner so that DRAM 126 data blocks are relocatable while a thread is active.

Once RM 222 creates a thread, a device driver determines when the thread accesses the media operating system 220 by activating the media operating system 220 through operations of the RM 222. After RM 222 allocates space for a thread, RM 222 creates and places the thread in a non-scheduled, "paused" state until initialization of the thread is finished. When the thread is ready to execute, RM 222 changes the thread state to "active" so that the thread is scheduled for processing. RM 222 selectively and asynchronously pauses a thread at any time, thereby rendering the thread inactive. RM 222 also selectively reactivates the thread later. RM 222 usually asynchronously pauses a thread before releasing (deallocating) the thread.

In addition, RM 222 minimizes ring transitions between the protection rings and thunking by providing both 16-bit and 32-bit dynamic link libraries (DLLs). Thunking is a process by which 16-bit 80×86 code modifies certain process calling sequences to allow it call 32-bit code. Thunking is implemented in software, and mainly involves reconstructing part of a stack for parameter passing and return.

XOS 224 controls data communications among the various hardware components that access data in the DRAM 126. XOS 224 also controls cycle timing of the media signal processor 132 and input/output bandwidth through control of the memory controller 122. XOS 224 also controls various designated tasks, here identified as XOS tasks 240, 242 and 244. XOS 224 also manages usage of the register file 134, state transitions for XOS tasks or threads 240, 242 and 244, and interrupt service routine activation.

XOS 224 is a collection of media operating system-based software that enables the real-time multitasking and interprocess communication on the media operating system 220. XOS 224 controls use of the on-chip static RAM 140 through the control of threads. For each thread, XOS 224 specifies a data area and instruction cache location of the on-chip static RAM 140. XOS 224 also controls the data or code segments of DRAM 126 that the thread currently uses. XOS 224 supports queues for passing messages and data between media operating system 220 and threads and software tasks running under the host operating system 210.

A thread, an interrupt service routine (ISR), or software running under the host operating system 210 uses RM 222 to post a queued message to an XOS thread. A thread or software routine executing under the host operating system 210 using RM 222 waits for a queued message from an XOS thread. XOS queues are located in DRAM 126.

Thread processing operates through cooperation of the RM 222 and XOS 224. XOS 224 supports multiple pseudo-simultaneous threads of media operating system 220 instruction execution. (Pseudo-simultaneous execution refers to time-interspersed execution of segments of a thread so that multiple threads appear to be executing simultaneously). XOS threads are conceptually similar to processes or tasks in other operating systems. RM 224, while running on the host processor 112, creates XOS threads. RM 224 initializes the context of a thread and initializes DRAM 126 storage before the thread is activated. The context of a thread is information associated with the thread. The context of a thread is initialized by setting values of on-chip static RAM 140 and of I/O registers (not shown). XOS 224 and RM 222 in cooperation furnish simultaneous operation by processing the thread, of a plurality of threads, having the closest deadline. Each thread receives access to the media operating system 220 processor when access is needed.

Active threads execute in one of three states. The states include a running state when the thread is executing under the media operating system 220, a waiting state when the thread is unable to run until an event occurs and a read state while the thread is halted to allow another thread having a nearer deadline to execute. For each thread, XOS 224 specifies the on-chip static RAM 140 location of target data areas and instruction cache areas. RM 222 allocates DRAM 126 space, and creates and evicts threads. Once RM 222 creates a thread, the appropriate device driver of device drivers 202, 204 and 206 determines when the thread gains access to the media operating system 220 by activating the thread through RM 222. XOS 224 controls which DRAM 126 data or code segments the thread currently uses.

A thread having the closest deadline runs. Only one thread runs at any instant. A thread starts running in one of two ways. If a waiting thread receives a posted event, the thread starts running ready if its deadline is the closest. A thread that is ready starts running when its deadline suddenly becomes the closest because the previously running thread has called an XOS wait function or has finished processing. A thread stops running in one of two ways. When the running thread calls an XOS wait function, it changes to the waiting state. When another thread's deadline becomes the closest, the thread currently running is moved to a ready state until its deadline is once again the closest.

A thread begins waiting by calling an XOS wait function. When a waiting thread receives a Post from an interprocess communication (IPC), the thread begins running if the deadline is the nearest. If a thread receives a posted message, but the deadline is not nearest of other ready threads, the thread changes to a ready state. A thread becomes ready in one of two ways. If a running thread is preempted by another thread with a nearer deadline, the preempted thread changes to ready until the deadline is the nearest. If a waiting thread receives a posted message, but the deadline is not nearest, the thread changes from waiting to ready. A thread changes from ready to running when the deadline is nearest.

Figure 3:
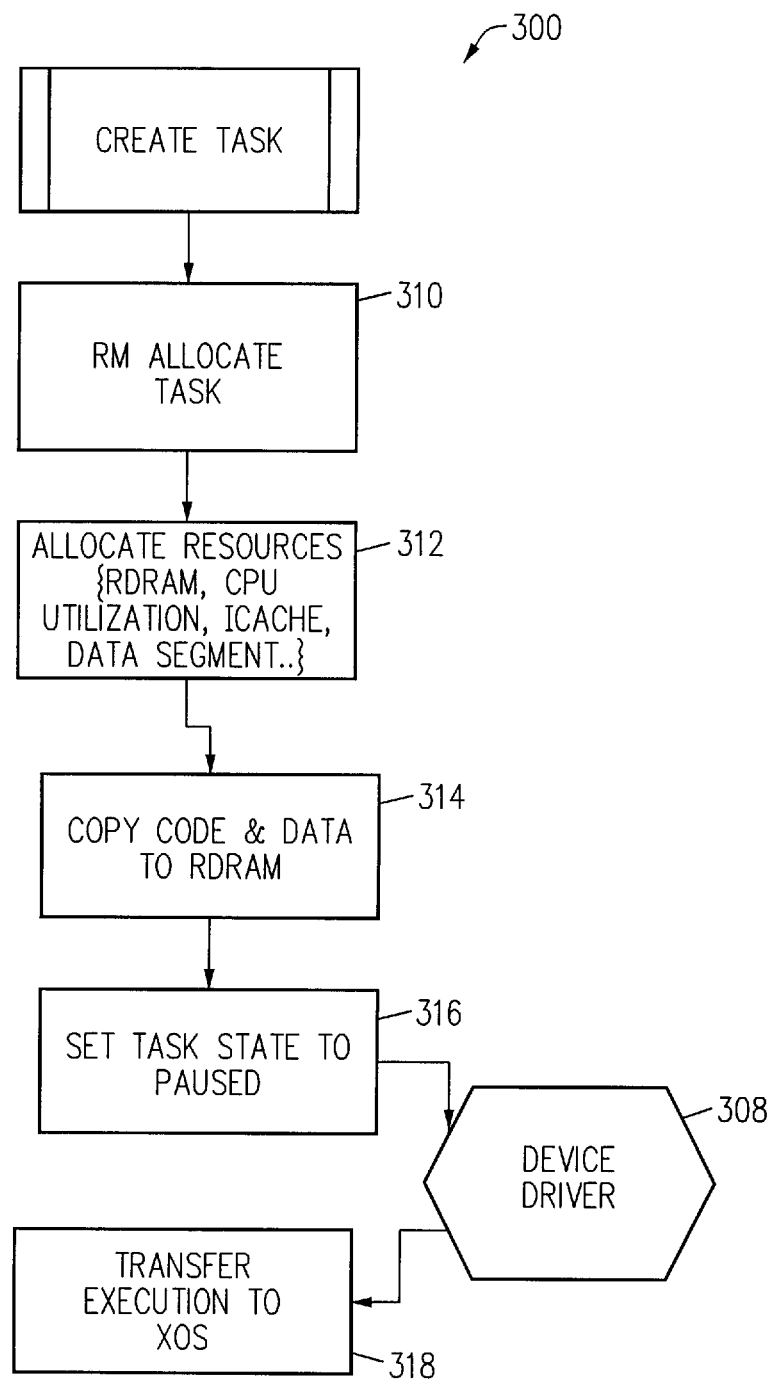
FIG. 3 is a flow chart which illustrates steps of a create task routine in the media processor system.

Referring to FIG. 3, a flow chart illustrates steps of a create task routine 300 in which the resource manager (RM) 222 allocates a thread and the interprocess communication operating system (XOS) 224 activates the thread on the media input/output circuit 130. A device driver 308 signals the RM 222 to request activation of a task. RM 222 activates the task so that the task accesses the media input/output circuit 130. In allocate task step 310, RM 222 allocates the task by creating a task data structure and initializing the data structure. RM 222 represents an XOS task with a C++ class with a definition, as follows:

```
struct RMThreadAttr : RMNodeAttr
{
    10  RMTreadAttr( );
    10  DWORD fPriority;         //priority for this object,
                                  10  for tasks only, minimum 0
    10  DWORD fPerfLevel         //the initial "performance"
                                  10  level, for tasks only
    10  DWORD fSize;             //for allocating objects with
                                  10  no image file
    10  VSPWord fDeadline;
    10  DWORD fSignalMask;
    10  DWORD fSMEMMask;
    10  DWORD fConstantMask;
    10  DWORD fICacheMode;
    10  DWORD fSlack;
    10  DWORD fReserved1;
    10  DWORD fReserved2;
};
```

In allocate resources step 312, RM 222, which controls static resource management and allocation, allocates resources including DRAM 126, the media signal processor 132, and I/O bandwidth among other resources. Resource allocation is handled by an "allocate" RMThread class method. An RMThread class method is a software utility that creates, initializes, activates or terminates an RM thread. An object of an RMThread class method represents a single class to the interprocess communication operating system (XOS) 224. Methods of the RMThread class methods include an allocate method, a set context data method, an activate method and a pause method.

The allocate method loads resources owned by a thread onto the media input/output circuit 130. RM 222 prevents downloading of resources to the media input/output circuit 130 until RMThread::Allocate() is called. Allocate alters DRAM 126 resource allocation if sufficient resources are available. If sufficient resources to complete allocation are unavailable or downloaded resources are not fully linked, the allocate returns an error response. The set context data method sets context data of a thread in the register file 134 before the thread begins execution. The activate method activates the thread and the pause method pauses the thread.

RM 222 creates a thread and, as the thread is created, allocates a code segment of DRAM 126 belonging to the thread. RM 222 and XOS 224 support more than one code segment per thread. Also as the thread is created, RM 222 allocates a data space of DRAM 126 belonging to the thread. A thread may own multiple data segments in DRAM 126 and may switch between the data segments by calling a utility, xosSetDataSegment(). Only RM 222 can increase allocated DRAM 126 resources of a thread. These resources are increased by a thread signaling the host operating system 210 since no malloc() or free() functions are available through software code in the XOS 224 alone. RM 222 dynamically relocates data blocks in DRAM 126 while a thread is active. RM 222 prevents improper data accessing by temporarily blocking operation of a thread while relocating the data segment of the thread.

During creation of a thread, the DRAM 126 data space of the thread is initialized with programmed values.

In copy code and data to DRAM step 314, RM 222 copies a code image for the thread to DRAM 126 by linking and downloading code into blocks of DRAM 126. RM 222 may dynamically relocate code blocks of DRAM 126 while a thread is active. RM 222 copies the code and data to DRAM 126 over the PCI bus 124.

In set task state to paused step 316, RM 222 places the thread in a nonscheduled, "paused" state until initialization of the thread is complete. When the thread is ready to run, RM 222 changes the thread state to "active" state so that the thread is scheduled for running. After allocating space for the thread, RM 222 can asynchronously pause a thread at any time, rendering the thread inactive. RM 222 can subsequently reactivate the thread.

In transfer execution to XOS step 318, XOS 224 loads the thread to run on the media input/output circuit 130. Each XOS thread has one entry point that is called when the thread is initially activated by RM 222. The entry point of the thread is specified when the thread is created by RM 222. The entry point address is a DRAM 126 address executing from an instruction cache region of DRAM 126. For each thread, XOS 224 controls the data and code segments of DRAM 126 that are used by the thread at any time.

Figure 4:
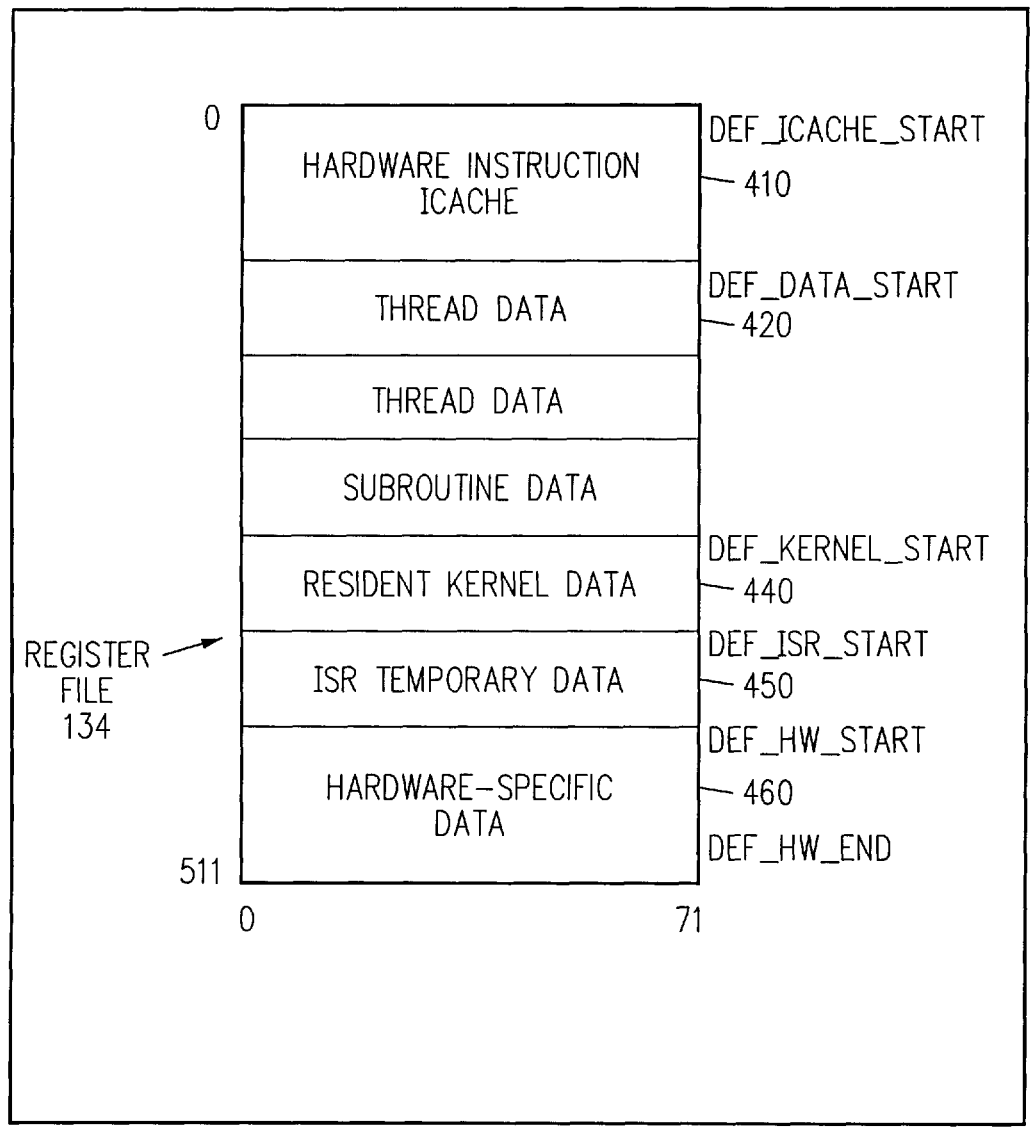
FIG. 4 is a pictorial representation of a register file in the media processor system.

Once a thread is running, the thread has access to the register file 134. FIG. 4 is a pictorial representation of the register file 134. Register file 134 is simultaneously accessed by various hardware components and by XOS 224 or threads running under XOS 224. The register file 134 holds program code and working data, furnishing sufficient space to move data and code between the media input/output circuit 130 and the host processor 112.

The register file 134 includes a hardware instruction cache 410 from location 0 to a location designated DEF_DATA_START to furnish a caching functionality to instructions executing on the media signal processor 132. Thread data 420 begins at location DEF_DATA_START and is available for usage by the thread. Thread-specific variables described in the RMThread object specify how thread data is utilized. Task data includes constants, data or subroutine data which are specified in the data structure RMThreadAttr:RMNodeAttr by the fSMEMMask, fConstantMask and fIcachemask double words. Resident kernel data 440 is an XOS-reserved area for holding resident operating system data that is continuously stored in the register file 134. Resident kernel data 440 contains data and code for usage by the operating system. ISR temporary data 450 is a data area that is owned by an interrupt service routine that is processing during an instant. Hardware-specific data 460 is a 64-double word area that is reserved for hardware-specific data, as follows:

| Region | Size | Register file location |
| --- | --- | --- |
| PBUS DMA buffers | 12 dwords | 448 |
| Extra kernel registers | 4 dwords | 460 |
| PCI FIFO | 16 dwords | 464 |
| ISA emulation FIFO | 16 dwords | 480 |
| Video FIFO | 16 dwords | 496 |

Register file 134 is divided into 16 double word segments, allowing XOS 224 to operate efficiently using special instructions to access an entire segment at one time. In this manner, register file data is copied more efficiently.

A thread, once running, continues to run until completion or pre-emption by another thread. When a thread is pre-empted, the thread context is saved to a safe location in the register file 134. XOS 224 performs this save operation.

Figure 5:
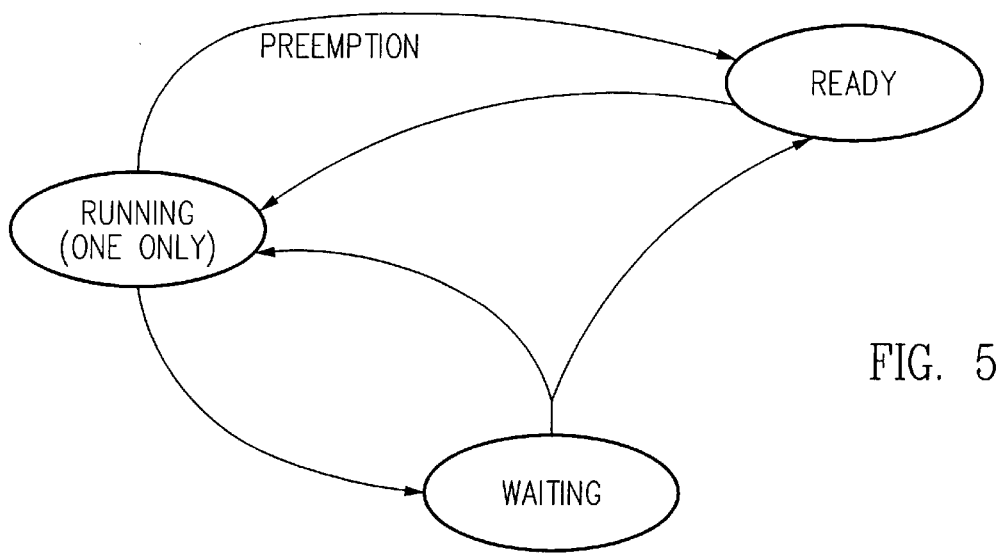
FIG. 5 is a state diagram showing operative states of a thread that is generated and processed by the media processing system.

Referring to FIG. 5, a state diagram showing operative states of a thread illustrates that both interrupt service routines (ISRs) and XOS threads post interprocess communication (IPC) messages. Tasks operating under the host operating system 210 post an IPC message through RM 222. When the deadline of a thread becomes the nearest deadline, XOS 224 automatically preempts a currently running thread. The preempted thread enters the ready state and remains in a ready state until the deadline of the preempted thread is once again the nearest. Accordingly, XOS 224 supports real-time preemptive threads with nearest deadline scheduling. A running thread is preempted by another thread only when several conditions are satisfied. First, an interrupt occurs and the ISR corresponding to the interrupt posts an IPC event to one or more threads. Second, at least one of the posted threads is waiting for the ISR's IPC event. Third, at least one of the posted threads has a nearer deadline than the currently running thread.

A host task utilizes RM 222 to call an RM function that posts a thread signal. Similarly, a task awaits a return from RM 222 or awaits a post to RM 222 using an RM function. Typically, tasks running under the host operating system 210 do not wait for a signal from an XOS thread.

A thread is terminated by returning from the entry point subroutine of the thread. At termination, a thread ceases execution but does not free resources. To return properly, a thread saves its initial reg_vsp_link register value and restores it before control is returned from the thread to the operating system. To terminate itself properly, a thread sends an IPC message back to host software to interface with RM 222 so that RM 222 can free the resources belonging to the departing thread. Calls from RM 222 are used to allocate threads and to set context data and variables for threads. Similarly, RM 222 controls pausing, activation and posting of thread signals.

Figure 6:
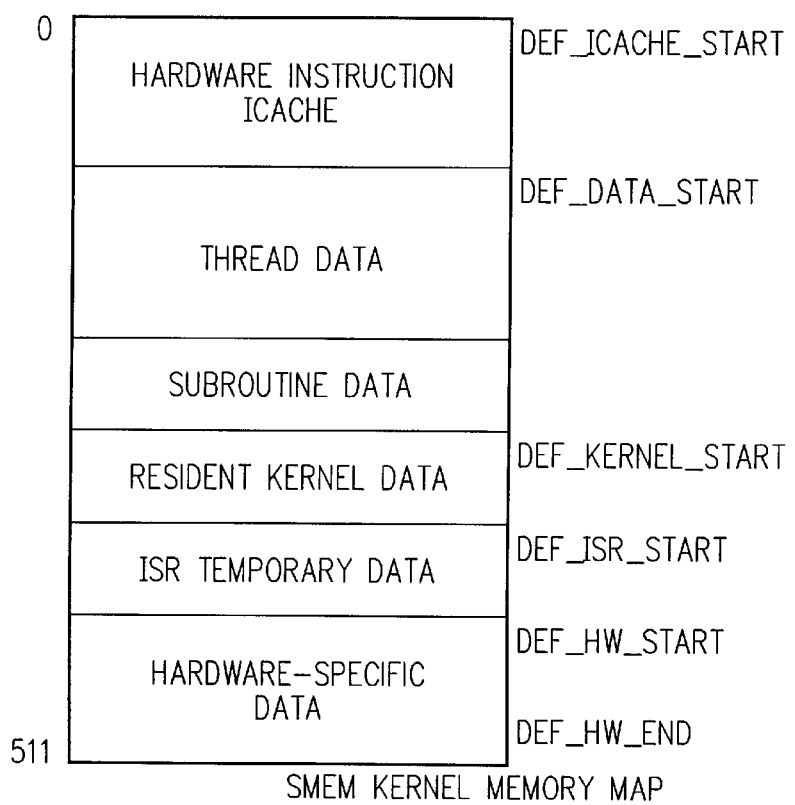
FIG. 6 is a memory map of an on-chip static RAM within the media processor system.

Referring to FIG. 6, a memory map of the on-chip static RAM 140 is shown. A thread data area is defined in on-chip static RAM 140 location, typically adjacent to the instruction cache 410 shown in FIG. 4. RM 222 sets the size of the thread data area, in one embodiment, to 288, 352 or 384 double words of memory and sets respective instruction cache capacities of 128, 64 or 32 double words. Sizes are changed using calls to XOS 224 so that XOS 224 tracks the amount and location of thread data area in on-chip static RAM 140.

XOS 224 also tracks other context information of threads including thread identifiers, registers of the media input/output circuit 130. During a context switch, XOS 224 saves contents of many of these registers.

Figure 7:
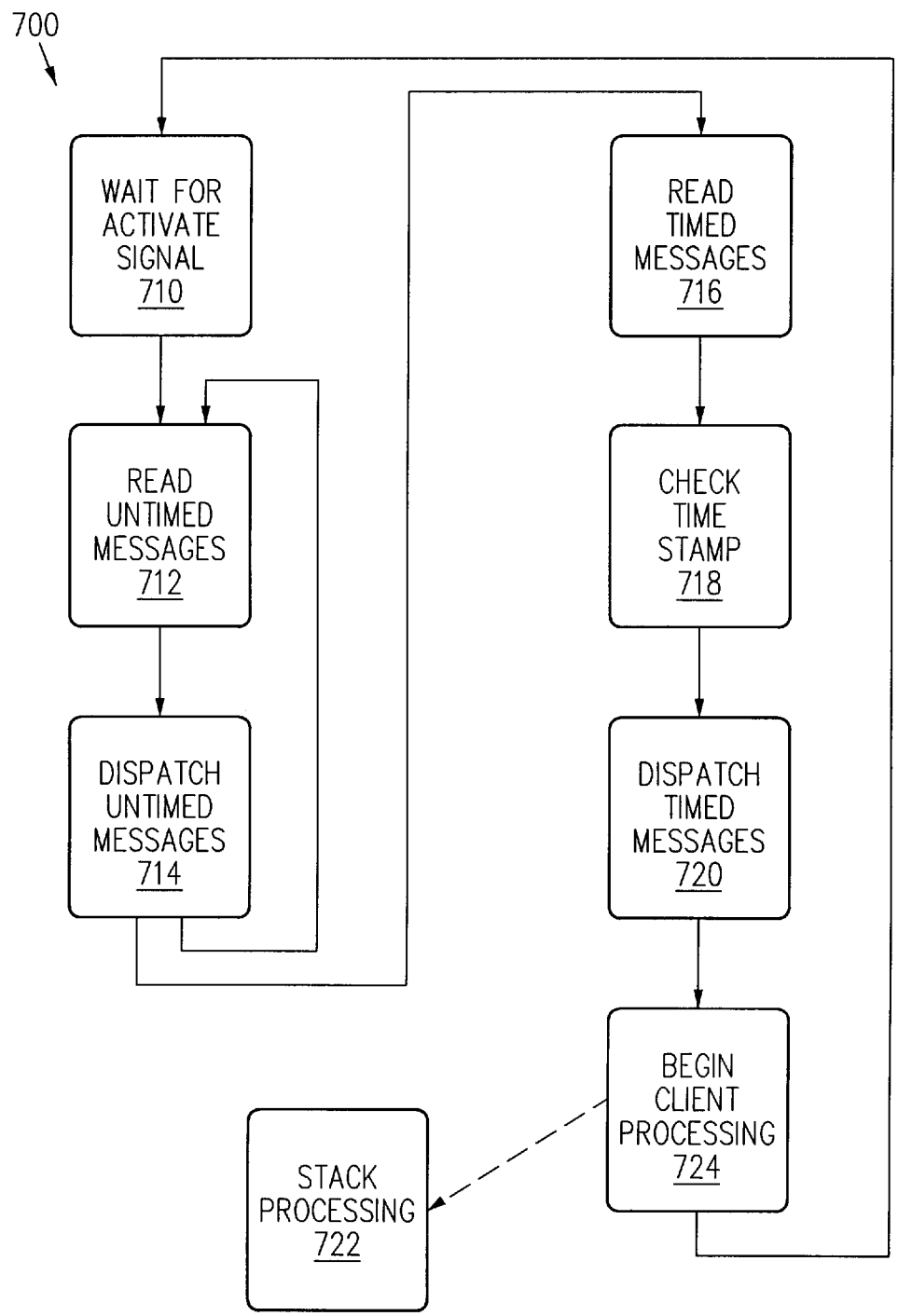
FIG. 7 is a flow chart illustrating an overview of the functionality of a synchronous net list processing routine.

FIG. 7 is a flow chart illustrating an overview of the functionality of a synchronous net list processing routine 700. A task running under the host operating system 210 sends messages asynchronously and posts these messages to two first-in-first-out (FIFO) message queues located in DRAM 126 shown in FIG. 1. The two message queues are an untimed message queue and a timed message queue, that are used by the synchronous net list processing routine 700. Synchronous net list processing routine 700 functions in an event-driven loop and typically begins the loop in a waiting state, shown in FIG. 7 by a wait for activation signal step 710. Synchronous net list processing routine 700 waits for a thread signal from the PBUS 138 interrupt service routine, which occurs when an audio signal coder/decoder (codec) requires more samples. After synchronous net list processing routine 700 is activated by the interrupt, synchronous net list processing routine 700 reads messages from the message queues. Synchronous net list processing routine 700 first reads messages from the untimed message queue in read untamed messages step 712. Untimed messages are read in the order of reception. Synchronous net list processing routine 700 then dispatches pending messages from the untimed message queue to a process table which designates message handling routines that are associated with corresponding client processes, in dispatch untimed messages step 714. The process table is an array of process slots, each of which holds information for referencing and calling a subprocess of the synchronous net list processing routine 700. Following dispatch untamed messages step 714 control loops back to read untimed messages step 712 until all untimed messages are read.

Next, in read timed messages step 716, synchronous net list processing routine 700 reads timed messages in a serial manner, checking the time stamp of the first timed message in check time stamp step 718. If a time stamp exceeds current time, as determined by synchronous net list processing routine 700, the message is not processed and left in the timed message queue. Otherwise, timed messages are dispatched to the process table in dispatch timed messages step 720. Timed messages are dispatched in chronological sequence so that only the first message is checked for the time stamp. If the first message is left in the timed message queue, subsequent messages have an equal or greater time stamp so that all messages are left in the queue. The timed message queue allows precise sequencing of control messages to synchronous net list processing routine 700 client processes via message handling routines of processes.

In begin client processing step 724, client processes are activated by cycling through the process table in order. All usable messages have been dispatched to the dispatch table round-robin so that synchronous net list processing routine 700 functions in two distinct phases: a message processing phase and a process sequencing phase. In this manner, messages are not processed so that operational parameters are not altered during signal computation that takes place during process sequencing. During the process sequencing phase, the message processing phase of the synchronous net list processing routine 700 is inactive, awaiting a next activating signal from the PBUS 138.

The client processes are active and processing during stack processing 722. The stack processing operation takes place under control of the client processes and is implicit with respect to the synchronous list processing routine 700. Signals are sent between client signal processing elements in "ticks" of 64-sample length arrays. These ticks are pushed onto a stack by a client process that sends the tick and popped off of the stack by another client process that receives the tick. The stack is formed partially in DRAM 126 and partially in SRAM 140 shown in FIG. 1. The order of stack operations resulting from client sequencing completely determines the signal flow topology.

Figure 8:
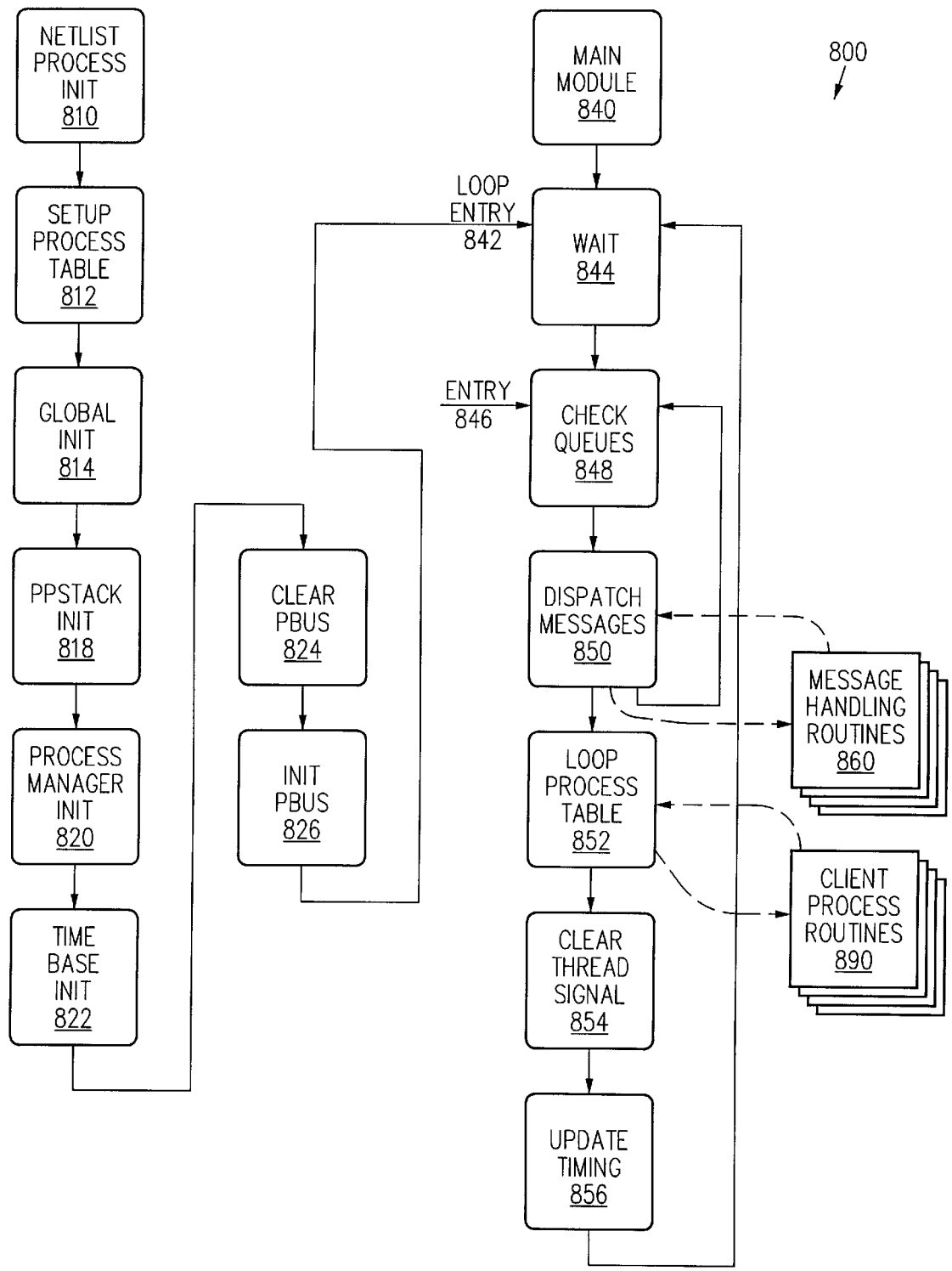
FIG. 8 is a flow chart which illustrates steps of a synchronous net list processing routine executing on the media signal processor.

Referring to FIG. 8, a flow chart illustrates detailed processing steps of a synchronous net list processing routine 800, which executes under XOS 224 on the media signal processor 132. Synchronous net list processing routine 800 manages a network of interconnected software processes and modules. Specifically, synchronous net list processing routine 800 performs functions including message dispatching, process sequencing and signal flow management. Synchronous net list processing routine 800 dispatches messages to achieve synchronous processing of processes requested using real time messages. These processes, for example, include process control and parameter update processes, such as volume control processes. Synchronous net list processing routine 800 processes signals in a manner that is scripted or choreographed by posting timed messages at selected points in time as determined by a time stamp set by a calling task operating on the host processor, for example, a MIDI sequencer.

The synchronous net list processing initialization module 810 is called when the media processor system 100 first begins execution. Substantially all software and hardware structures that are utilized in synchronous net list processing are initialized in the initialization module 810 so that initialization is consolidated without mixing state contexts of the various structures. Initialization sets up the synchronous net list processing routine 800 to queue information from RM 222 in a timed message queue and an untimed message queue and to receive semaphore information from RM 222. Usage of a timed message queue advantageously sequences playback of audio signals while furnishing accurate waveform sampling and reproduction. Because messages are posted with precise time stamps in the timed message queue, timing of the multiple messages are synchronized so that an accurate timer is not necessary. Set up process table step 812 sets initial operating parameters of a process table in DRAM 126. Global initialization step 814 sets up interrupt drivers such as a coded signal MIDI interrupt driver (not shown). Global initialization step 814 also initializes various parameters in the stack and acquires an identifier for each queue of a plurality of queues. A stack initialization step 818 initializes the stack including setting the stack pointer. A process manager initialization step 820 initializes the number of active processes to zero. A timebase initialization step 822 sets a time reference to zero. The timebase is used for comparing to a time stamp of a message to determine whether to perform a message on the timed message queue. A clear peripheral bus step 824 clears the peripheral bus (PBUS) buffers prior to starting the peripheral bus. An initialize peripheral bus step 826 sets the peripheral bus to begin data transfers.

The main operating module 840 includes library code for the synchronous net list processing routine 800 and defines data structures in DRAM 126. Main operating module 840 furnishes an operating framework for processing messages that are received in real time. Main operating module 840 operates in a main event loop within which all message processing operations of the synchronous net list processing routine 800 take place. Timing is controlled in the media processor system 100 on the basis that the main operating module 840 operates in a loop which is based on externally timed signals. The main operating module 840 begins with a loop entry point 842 at which a wait step 844 is positioned. In wait step 844, software waits for audio codec output synchronization step or an immediate signal using a thread signal handler which is set to process immediate signals. A message with a properly formatted header is posted to an appropriate queue in XOS 224, either the timed message queue or the untimed message queue. When a signal is received, at entry point 846, software checks incoming message queues in check queues step 848. Check queues step 848 reads the headers of the messages and tests that the entire length of the message body is loaded into the queue buffer. Check queues step 848 first checks the untimed message queue and then checks the timed message queue. If messages are available to be processed, dispatch messages step 850 performs message processing by forwarding the designated messages to message recipient routines shown as a pluralilty of message handling routines 860. The recipient routine is simply a target function. If the recipient's indicated context data is in relocatable memory space, the data segment register is set using a designated handle and the indicated message handler function is called. If the code is in relocatable space, which is designated by a cleared sign bit, then a far call operation is performed. Otherwise a normal call is made.

In dispatch messages step 850, entries from the timed and untimed message queues are read into a message buffer, which is located in DRAM 126 shown in FIG. 1. Up to 64 double words of messages are read from the queue at one time. Batching of message queue read operations reduces overhead of XOS queue accesses. As many untimed messages as fit in the message buffer are repeatedly read from the untimed message queue until the queue is empty. Timed messages are read from the timed message queue and buffered locally. Timed messages are processed in the order of reception and wait until the current system time, measured in ticks, is equal to or greater than the time stamp of the oldest message. The recipient routines set up the process table.

Messages are designated by a message header, which is a structure immediately preceding a message body. The first word defines the length of the message, other than the header, in bytes. The second word sets forth the designated recipient process identifier for the process to be performed. The identifier is an index number into the process table. The third word is a time stamp in units of tick counts. The time stamp designates when a timed message is to be delivered. The time resolution is ticks. Also in the message header are fields for holding a function pointer to a message handler, a code relocation offset, a recipient's context data pointer and a context data segment relocation offset.

After processing of each message is complete, the dispatch messages step 850 loops back to the check queues step 848. In loop through process table step 852, software progresses through the process table in a round-robin order, executing each module in sequence. When all modules of the process table have been executed, clear thread signal step 854 clears the activating thread signal and update timing step 856 updates the tick timer and then loops to the loop entry point 842 where software waits for audio codec interrupt before continuing.

The dispatch messages step 850 dispatches messages to a message handling routine of message handling routines 860, which returns at completion. Messages are variable in length and include a three double word header followed by data. RM 222 passes messages into the untimed or timed message queue of the synchronous net list processing routine 800 using XOS 224 data structures and communication routines. Messages from the timed message queue that have been read but not processed are transferred to a DRAM 126 storage area to temporary holding. The message module contain routines that handle storage and retrieval of timed messages from the temporary storage area in DRAM 126. The dispatch messages step 850 is called with various parameters set. A current queue identifier is set to a designated XOS queue, either the untimed message queue or the timed message queue. A message read byte remaining count is set to the number of bytes left in the queue buffer which is currently read. A read pointer is set to the beginning of the valid portion of the queue buffer from which reading is to begin. The read pointer may be set to zero to reset the pointer to the beginning of the queue buffer. The queue buffer, either the untimed or the timed queue buffer, is preloaded with appropriate data in appropriate locations if the read pointer is not set to zero. A timed message queue flag is set if timed message processing is desired. For timed messages, the dispatch messages step 850 dispatches messages while comparing time stamps with the current tick count. Dispatch messages step 850 returns when no additional messages are held on the timed message queue or until a message with a future time stamp is encountered. The unprocessed message is retained in the timed message queue buffer. For a retained message, the calling function that called the retained message saves the timed message queue buffer in temporary storage in DRAM 126 and restores the message to the timed buffer queue in the next call. The read pointer and the read byte remaining count reflect the status of the queue buffer.

If the timed message queue flag is not set then the queue to be read is the untimed message queue. For a message in the untimed message queue, the queue is read until empty. The time stamp field is ignored. Upon return from the dispatch messages step 850 following processing of an untimed message, the queue buffer is assumed to be empty.

Figure 9:
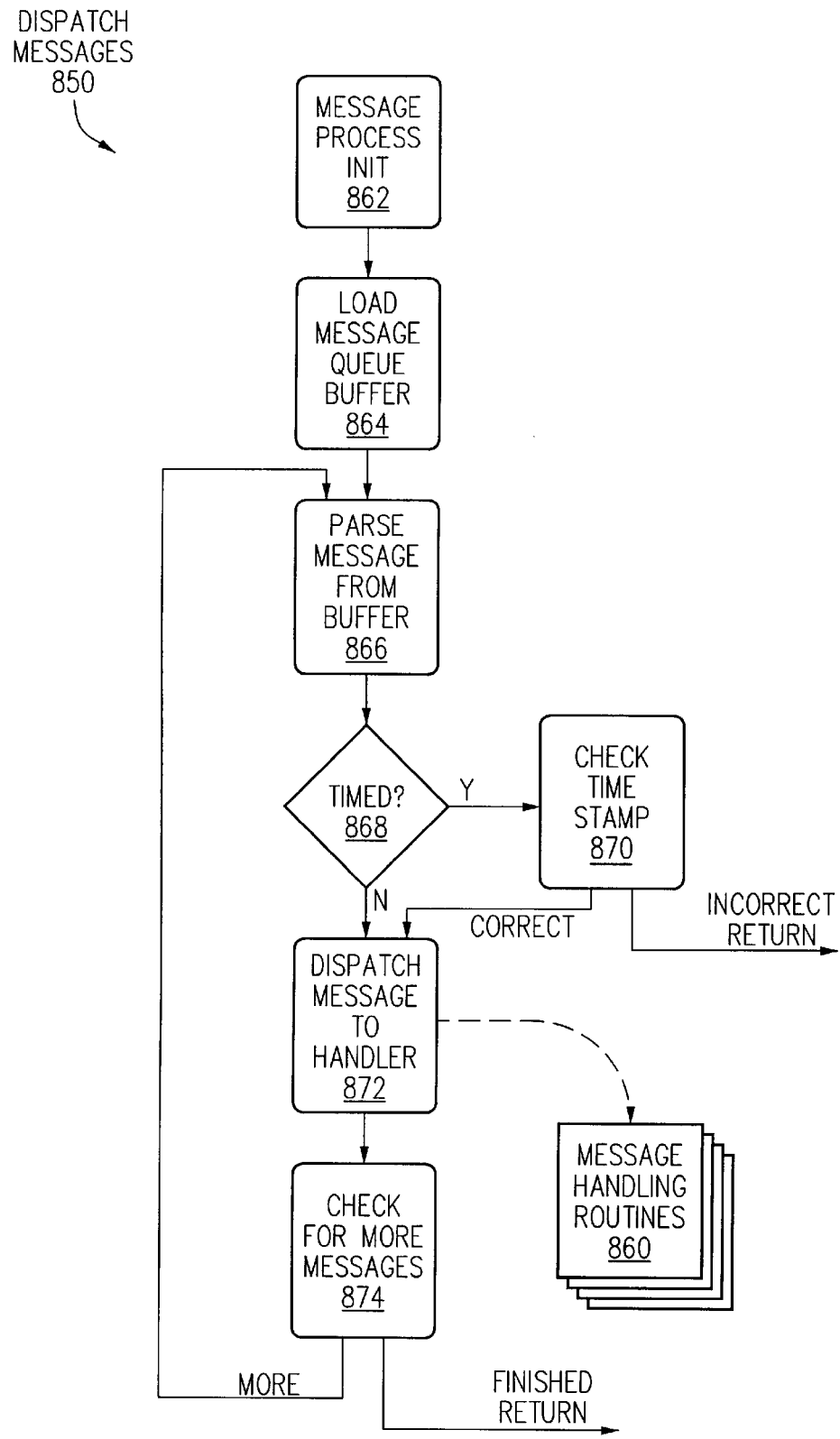
FIG. 9 is a flow chart showing steps of a message routine which is a portion of the synchronous net list processing routine.

Referring to FIG. 9, a flow chart shows steps of the dispatch messages step 850. In a message processing initialization step 862, software resets the read pointer to the beginning of the queue buffer and writes a peak queue buffer load level value to cache for later comparison. Software also saves a return link value. Load message queue buffer step 864, software normalizes data for a double word count rather than for a byte count and saves a link register. Load message queue buffer step 864 then compacts the message buffer toward the front of the buffer, calculates the base address of the buffer and resets the buffer pointer to the beginning of the buffer. Parse message from buffer step 866 reduces the constituent fields of the message in preparation for dispatching of the message. A timed message logic step 868 determines whether the message is a timed message or an untimed message. If the message is a timed message, check time stamp step 870 determines whether timing of the timed message is correct. If not, dispatch messages step 850 returns. If the timing is correct, dispatch message to handler step 872 dispatches parsed messages to the process table. If the message is an untimed message, as determined by check time stamp step 870, dispatch message to handler step 872 is performed without timing checks. Dispatch message to handler step 872 dispatches messages to a message handling routine of message handling routines 860. Check for more messages step 874 checks for more messages and loops to parse message from buffer step 866 when more messages are in the queue and otherwise returns.

Referring again to FIG. 8, the client process routines 890 include a plurality of signal processing modules that are designated by the process table. A control block in the synchronous net list processing routine 800 has data fields for tracking the number of total processes to be run and the next process to run. To produce one of sound samples, usually 64 samples, client process routines are activated by progressing down the process table, loading the next process slot from a process slot table in DRAM 126 and performing a call or far call operation to the registered entry point of a subprocess. A client process may alter its entry point for the next call or may cause synchronous net list processing routine 800 to skip a number of entries on the queue by modifying a next process pointer. This characteristic is useful for a process that acts as a gate for dependent subprocesses, allowing a block to execute conditionally.

A structure is defined which contains macro, typedef, memory map and other definitions that are used by a client routine running under the synchronous net list processing routine 800. This structure is organized to include temps, constants and states. Temps are used as scratchpad space during tick computation. Constants include control parameters and constants that are read-only with respect to the tick computation loop. Constants are often subdivided into private constants and constants which are shared among more than one instantiation of the module. Constants define operational parameters such as stack dimensions, time tick duration, data sample sizes, queue buffer sizes, buffer base addresses, and maximum message size. Other constants designate interface parameters such as audio codec input and output channels, peripheral bus offset definitions, and the like. A state is defined by variables that are altered by tick computation and preserved for subsequent iterations.

Various subroutines are furnished for managing the stack, including stack push, stack pop, lock and get pointer subroutines. A stack push subroutine reserves a designated number of bytes on the stack, up to a predetermined maximum at a time. The number of bytes is a multiple of eight. If the stack overflows, the spillage is spooled to DRAM 126 by calling the stack push subroutine. The stack push subroutine alters the link register so that appropriate saving and restoring of the link register is proper.

A stack pop subroutine removes a selected, unrestricted number of bytes from the stack. If the stack cache underflows, the stack is made empty and the balance of stack entries are removed from the top of the DRAM 126 stack.

The lock subroutine ensures that at least a designated number of bytes are loaded on the stack cache. If fewer than the designated number of bytes is on the stack, then a call is made to load in enough elements from the DRAM 126 cache to the bottom of the stack cache to make a total of designated number of elements. The lock subroutine alters the link register so that appropriate saving and restoring of the link register is proper.

The get pointer subroutine reads the stack pointer and sets the stack pointer to a designated byte with respect to the top of the stack. No checking is done to ensure that the designated element is actually in the stack cache so that the lock subroutine is properly called previous to the get pointer subroutine to assure that the element is in the stack cache.

Figure 10:
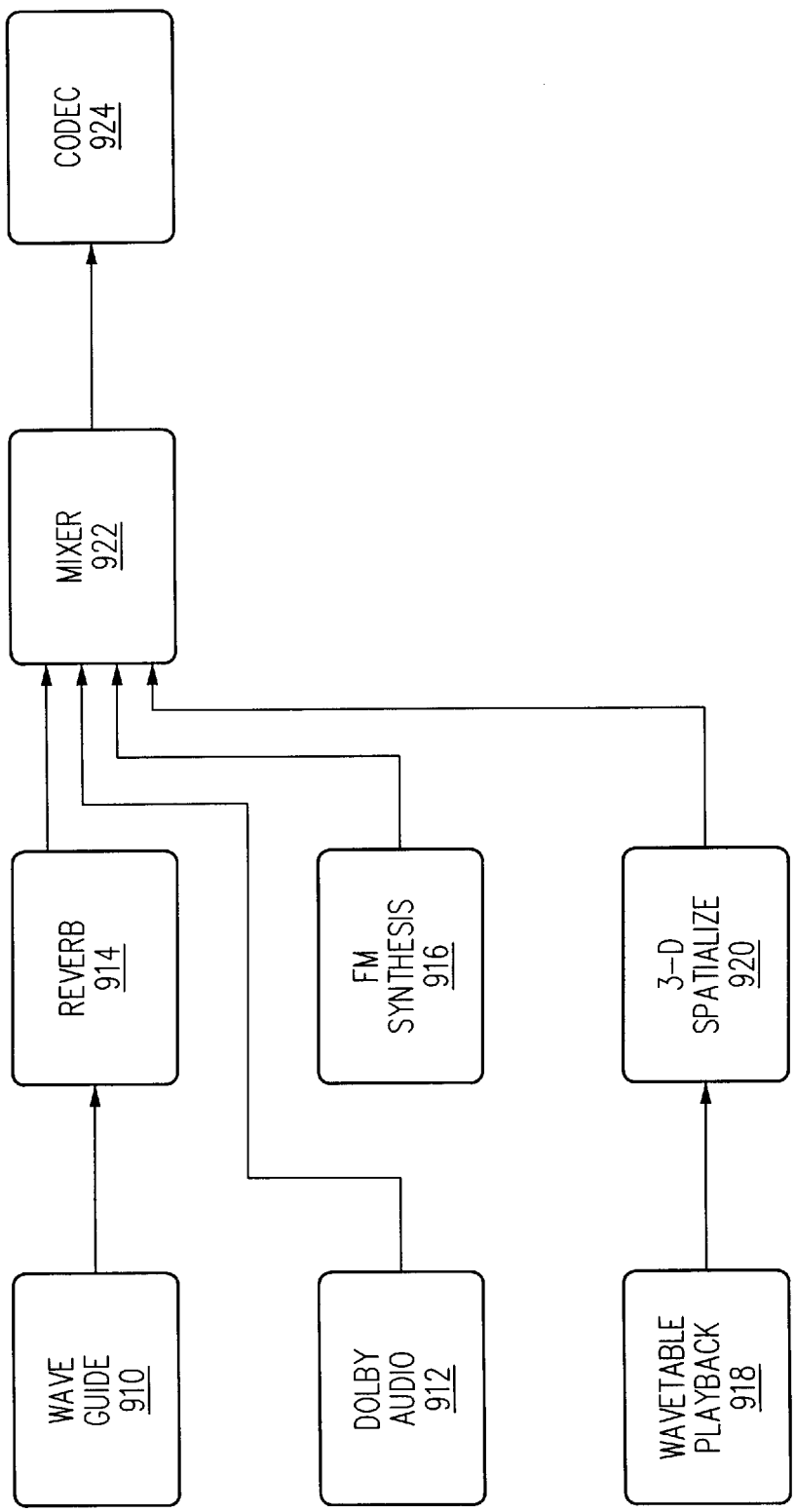
FIG. 10 is a pictorial block diagram showing an example of an audio signal flow topology in which several audio modules and processes are managed by the synchronous net list processing routine.

Referring to FIG. 10, a signal flow diagram shows various operations, or threads, that are implemented in an audio processor. In an audio processing system, the synchronous net list processing routine 800 performs functions of message dispatching, process sequencing and signal flow management with respect to audio signals. The synchronous net list processing routine 800 is well-adapted to processing of audio signals. For example, the message dispatching operation of the synchronous net list processing routine 800 dispatches timed messages for synchronous processing. Audio processing utilizes synchronous processing of audio signals in which parameter updates occur only at selected points in time. The process sequencing operation of the synchronous net list processing routine 800 is highly suitable for audio processing since audio signals are formed from a net list of multiple modules or processes that are subscheduled for performance through usage of a stack. The signal flow management aspect of the synchronous net list processing routine 800 is highly advantageous for audio processing. Audio client processes are derived from an audio net list that are generated by tasks running under the host operating system 210. These client processes make up the signal flow that is managed by the synchronous net list processing routine 800 to provide for a dynamically configurable topology of signal flow handling.

FIG. 10 shows an example of an audio signal flow topology in which several client processes, including audio modules and processes, are managed by the synchronous net list processing routine 800. These client processes include a wave guide process 910, a Dolby audio process 912, a reverb process 914, an FM synthesis process 916, a wavetable playback process 918, a 3-D spatialization process 920, a mixer module 922 and an audio signal coder/decoder (codec) 924. The client processes include suitable processes that are known in the art of audio signal processing. Examples of suitable processes are described in detail in references, as follows:

U.S. patent application Ser. No. 08/555,626 filed on the same day as the present patent application (Avery L. Wang, "Method and Apparatus for Spline Parameter Transition in Sound Synthesis", Attorney Docket Number M-3634);

U.S. patent application Ser. No. 08/555,536 filed on the same day as the present patent application (Avery L. Wang, "Non-Linear Tone Generator", Attorney Docket Number M-3513);

U.S. patent application Ser. No. 08/555,537 filed on the same day as the present patent application (Avery L. Wang and Brooks S. Read, "Method for Varying Pitch of a Musical Tone Produced Through Playback of a Stored Waveform", Attorney Docket Number M-3429); and U.S. patent application Ser. No. 08/555,538 filed on the same day as the present patent application (Avery L. Wang and Brooks S. Read, "Arbitrary-Ratio Sampling Rate Converter", Attorney Docket Number M-3191US).

Each of the identified patent applications is incorporated herein by reference in its entirety.

An audio signal is produced in a group of multiple samples per time interval of ticks. One tick includes either 32 or 64 samples in mono, stereo or omni form using a selected number of audio channels. At 1400 ticks per second, 32 samples are processed. At 700 ticks per second, 64 samples are processed. The sound codec generates sound ticks at a set system clock rate, for example 48 Khz. The synchronous net list processing routine 800 controls audio processing so that each module or process produces the same number of samples per tick.

Figure 11:
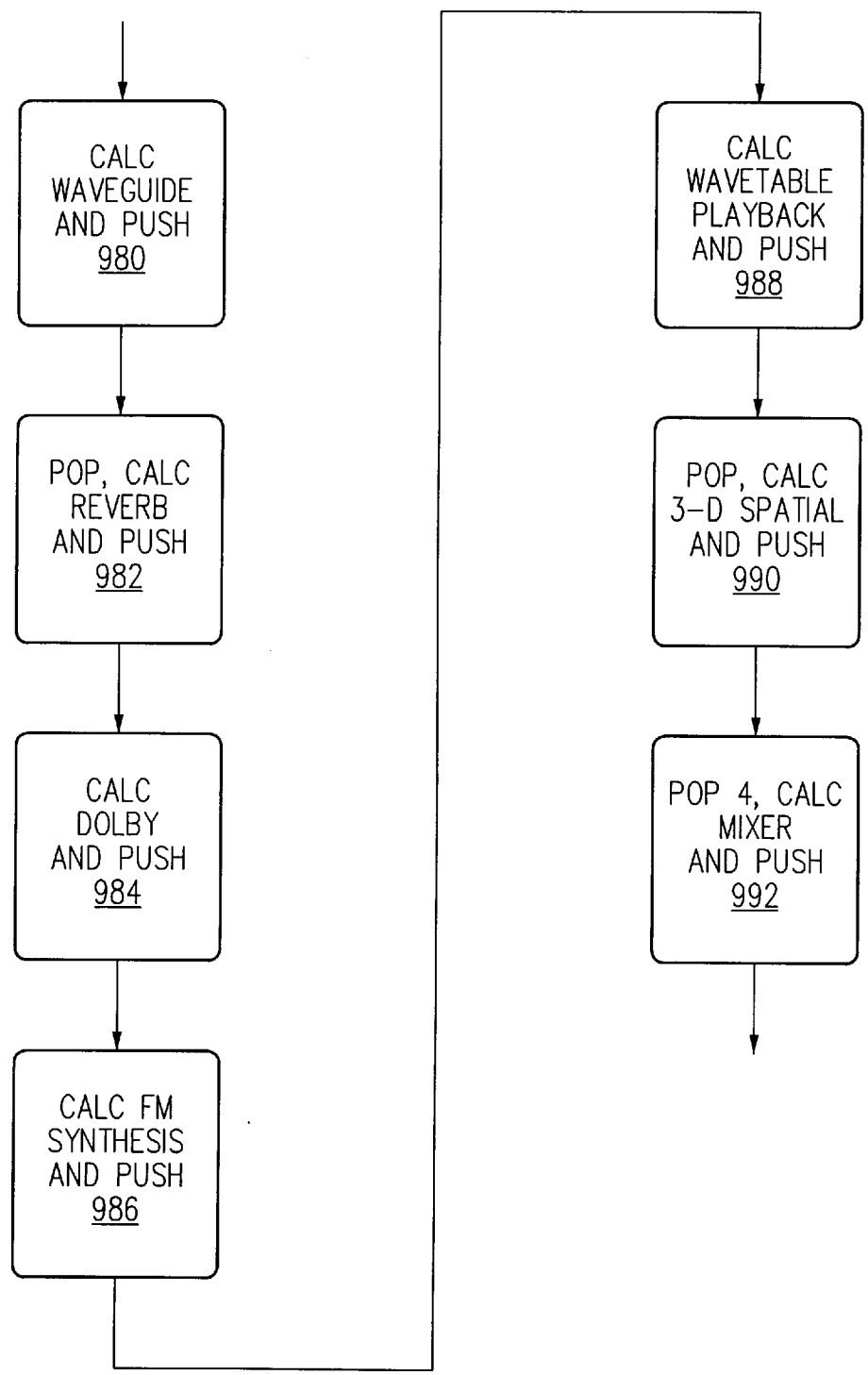
FIG. 11 is a flow chart showing stack operations performed during processing of audio signals.

The synchronous net list processing routine 800 uses the stack to define signal flow, using macro definitions to push and pop the stack pointer. Referring to FIG. 11 a flow chart of stack operations that take place in the processing of the audio signal flow topology shown in FIG. 10. In this manner, a linear process table with an implied topology is constructed from a net list. A pattern of stack pushes and pops causes the modules to become connected as shown in the net list. In step 980, the wave guide process 910 is calculated and a tick of audio samples is pushed on the stack. In step 982, the tick is popped off the stack, the reverb process 914 is calculated using the audio samples from the popped tick and a newly calculated tick is pushed on the stack. In step 984, the Dolby audio process 912 is calculated and a tick is pushed on the stack. In step 986, the FM synthesis process 916 is calculated and a tick is pushed on the stack. In step 988, the wavetable playback process 918 is calculated and a tick is pushed on the stack. In step 990, the tick pushed following the wavetable playback process 918 calculation is popped off the stack, the 3-D spatialization process 920 is calculated using the audio samples from the popped tick and a newly calculated tick is pushed on the stack. In step 992, all four ticks currently on the stack are popped, the mixer module 922 is calculated using the audio samples from the popped ticks and a newly calculated tick is pushed on the stack.

Usage of the stack for dynamically configurable topology of signal flow handling is advantageous since memory usage is reduced in comparison to usage of dedicated memory elements. Because the amount of memory used is reduced, the stack is advantageously implemented in static RAM so that speed performance is enhanced.

While the invention has been described with reference to various embodiments, it will be understood that these embodiments are illustrative and that the scope of the invention is not limited to them. Many variations, modifications, additions, and improvements of the embodiments described are possible which may fall within the scope of the invention as defined in the following claims.

What is claimed is:

1. A software system for controlling a real-time signal processor, the real-time signal processor including a host computer, a message queue, a stack and a media I/O circuit, the host computer for sending a plurality of messages designating ones of a plurality of corresponding signal processing operations asynchronously to the message queue, each signal processing operation corresponding to a client processing module wherein:

the media I/O circuit includes a means for generating a plurality of sequential output synchronization timing signals;

the host computer includes a host task having subroutine for parsing a new net list of signal processes to generate a new signal processing sequence;

the host task includes a subroutine for writing the signal processing sequence into a message queue;

the software system comprising:

a message processing routine for reading the messages from the message queue and dispatching the messages to designated ones of the plurality of client processing modules;

a process sequencing routine for invoking client processing modules and for controlling the stack, the client processing modules communicating signals by a sending client processing module pushing a signal onto the stack, and a receiving client processing module popping the signal from the stack;

a subroutine for waiting for an output synchronization timing signal;

a subroutine operating in response to an output synchronization timing signal for reading the signal processing sequence from the message queue; and a subroutine for copying the signal processing sequence into a process sequence table so that a new signal flow topology is specified.

2. The software system according to claim 1 wherein the signal processing sequence includes a sequence of messages, each message being designated by a message header and a message body, the message header including:

a designator of a message length;

a designator of a client processing module; and a designator of a time stamp.

3. The software system according to claim 2 wherein:

the message header is a structure immediately preceding the message body;

a first element defines the length of the message, other than the message header, in byte units;

a second element designates a client processing module as an index number into the process sequence table; and a third element designates a time stamp in units of tick counts indicative of when a timed message is to be delivered.

4. The software system according to claim 1 wherein:

the message queue includes a timed message queue on which timed messages are queued, the timed messages being encoded with a time stamp; and the message processing routine dispatches messages synchronously by comparing the time stamp to a current time counter, dispatching messages when due as determined by the comparison and holding messages that are not due for later dispatch.

5. The software system according to claim 1 wherein:

the message queue includes an untimed message queue on which untimed messages are queued; and the message processing routine dispatches untimed messages when untimed messages are pending.

6. The software system according to claim 1 wherein:

the order of client processing module sequencing determines the order of pushing and popping of signals from the stack, which defines a signal flow topology.

7. The software system according to claim 1 wherein:

a sending client processing module sends a message to a receiving client processing module via the stack in the form of an array of signal samples.

8. The software system according to claim 1 wherein:

the message processing routine executes at a time distinct from a time the processing sequencing routing executes so that messages are processed while process sequencing is inactive and processes are sequenced while message processing is inactive.

9. The software system according to claim 1 wherein:

the signal processing operations are audio signal processing operations and the client processing modules are modules for processing audio signals.

10. The software system according to claim 9 wherein the client processing modules are modules selected from the group including a wave guide process, a Dolby audio process, a reverb process, an FM synthesis process, a wavetable playback process, a 3-D spatialization process, and a mixer module.

11. A software system for controlling a real-time signal processor, the real-time signal processor including a host computer, a message queue, a stack and a media I/O circuit the host computer for sending a plurality of messages designating ones of a plurality of corresponding signal processing operations asynchronously to the message queue wherein:

the media I/O circuit includes a means for generating a plurality of sequential output synchronization timing signals;

the host computer includes a host task having a subroutine for parsing a new net list of signal processes to generate a new signal processing sequence;

the host task includes a subroutine for waiting the signal processing sequence into a message queue;

the software system comprising:

a plurality of client processing modules, each client processor module for processing signals and for communicating signals to a client processor module;

a message processing routine for reading the messages from the message queue and synchronously dispatching the messages to designated ones of the plurality of client processing modules;

a process sequencing routine for invoking client processing modules and for controlling the stack, the client processing modules communicating signals by a sending client processing module pushing a signal onto the stack, and a receiving client processing module popping the signal from the stack;

a subroutine for waiting for an output synchronization timing signal;

a subroutine operating in response to an output synchronization timing signal for reading the signal processing sequence from the message queue; and a subroutine for copying the signal processing sequence into a process sequence table so that a new signal flow topology is specified.

12. The software system according to claim 11 wherein the signal processing sequence includes a sequence of messages, each message being designated by a message header and a message body, the message header including:

a designator of a message length;

a designator of a client processing module; and a designator of a time stamp.

13. The software system according to claim 12 wherein:

the message header is a structure immediately preceding the message body;

a first element defines the length of the message, other than the message header, in byte units;

a second element designates a client processing module as an index number into the process sequence table; and a third element designates a time stamp in units of tick counts indicative of when a timed message is to be delivered.

14. The software system according to claim 11 wherein:

the signal processing operations are audio signal processing operations and the client processing modules are modules for processing audio signals.

15. The software system according to claim 14 wherein the client processing modules are modules selected from the group including a wave guide process, a Dolby audio process, a reverb process, an FM synthesis process, a wavetable playback process, a 3-D spatialization process, and a mixer module.

16. A signal processing system comprising:

a host computer system including a host processor and an execution memory;

a media input/output circuit coupled to the host computer system and including a media signal processor and a memory coupled to the media signal processor, the memory including a stack;

a host operating system for operating on the host processor;

a host task for operating under the host operating system on the host processor and generating a net list of messages on a message queue for selecting signal processing processes;

a resource manager (RM) software subsystem for operating on the host computer system;

an interprocess communication operating system (XOS) for interacting in cooperation on the host processor and the media signal processor;

a synchronous net list processing routine for executing under XOS on the media signal processor, the synchronous net list processing routine further including:

a plurality of client processing modules each corresponding to a signal processing process, each client processor module for processing signals and for communicating signals to a client processor module;

a message processing routine for reading the messages from the message queue and synchronously dispatching the messages to designated ones of the plurality of client processing modules; and a process sequencing routine for invoking client processing modules and for controlling the stack, the client processing modules communicating signals by a sending client processing module pushing a signal onto the stack, and a receiving client processing module popping the signal from the stack.

17. A signal processing system according to claim 16, wherein:

the media signal processor includes a codec for generating a plurality of sequential output synchronization timing signals;

the host task includes a subroutine for parsing a new net list of signal processes to generate a new signal processing sequence;

the host task includes a subroutine for writing the signal processing sequence into a message queue; and the synchronous net list processing routine further includes:

a subroutine for waiting for an output synchronization timing signal;

a subroutine operating in response to an output synchronization timing signal for reading the signal processing sequence from the message queue;

a subroutine for copying the signal processing sequence into a process sequence table so that a new signal flow topology is specified.

18. A signal processing system according to claim 16, wherein the media signal processor is a vector processor that performs simultaneous high-speed operations.

19. A method of scheduling a plurality of signal processes designated by a net list of signal processes using a stack-based protocol, the method comprising the steps of:

generating a plurality of sequential output synchronization timing signals;

parsing a new net list of signal processes to generate a new signal processing sequence;

writing the signal processing sequence into a message queue;

waiting for an output synchronization timing signal;

in response to an output synchronization timing signal, reading the signal processing sequence from the message queue; and copying the signal processing sequence into a process sequence table so that a new signal flow topology is specified.

* * * * *